(12) United States Patent
Butler (10) Patent No.: US 9,765,493 B2
(45) Date of Patent: Sep. 19, 2017

(54) FLUID DIRECTIONAL APPARATUS

(71) Applicant: GRAVITY WELLS TECHNOLOGY, INC., Bronx, NY (US)

(72) Inventor: Kent Butler, Bronx, NY (US)

(73) Assignee: GRAVITY WELLS TECHNOLOGY, INC., Bronx, NY (US)

( * ) Notice: Subject to any disclaimer, the term of this patent is extended or adjusted under 35 U.S.C. 154(b) by 91 days.

(21) Appl. No.: 14/874,700

(22) Filed: Oct. 5, 2015

(65) Prior Publication Data

US 2017/0096789 A1      Apr. 6, 2017

Related U.S. Application Data

(63) Continuation of application No. 14/224,298, filed on Mar. 25, 2014.

(51) Int. Cl.
*E02B 9/02* (2006.01)
*E02B 3/10* (2006.01)
*F03B 13/08* (2006.01)

(52) U.S. Cl.
CPC .............. *E02B 3/108* (2013.01); *F03B 13/08* (2013.01)

(58) Field of Classification Search
CPC ........................................... E02B 9/02
USPC ............ 60/697; 405/75, 78, 15, 16, 21, 107, 405/110, 111, 114, 115; 290/42, 43, 53, 290/54; 404/6
See application file for complete search history.

(56) References Cited

U.S. PATENT DOCUMENTS

| | | | |
|---|---|---|---|
| 6,679,654 B1 | 1/2004 | Wittenberg | |
| 8,956,077 B2 | 2/2015 | Abeles | |

*Primary Examiner* — Sunil Singh
(74) *Attorney, Agent, or Firm* — Law Offices of Alozie N. Etufugh, PLLC (57) ABSTRACT

The present invention features a flood damage prevention apparatus having a modular equilateral triangular prism enclosure with an interlocking system used to interlock and position additional modules of the apparatus during flood damage prevention deployment. The interlock system enables additional modules of the flood damage prevention apparatus to be locked in position. Each module may be protected from flood debris damage by way of a protective covering over each enclosure. The apparatus may be filled with fluid via a seal tight opening located on the surface of the enclosure which in turn may be closed using a seal tight apparatus.

4 Claims, 6 Drawing Sheets

FLUID DIRECTIONAL APPARATUS

CROSS-REFERENCE TO RELATED APPLICATIONS

This Application is a Continuation application of, and claims the benefit of, and is related to, Applicant's following patent application: U.S. Non-Provisional patent application Ser. No. 14/224,298 titled "FLUID DIRECTIONAL APPARATUS" filed Mar. 25, 2014, which is incorporated herein in its entirety.

FIELD OF THE INVENTION

The present invention relates, in general, to an apparatus used in flood protection, flood water channeling and energy generation.

BACKGROUND OF THE INVENTION

Sand bags are normally used to reduce or avoid damage resulting from floods. However, deployment of sand bags takes up considerable time and labor as the bags have to be transported to the deployment site and then manually filled with sand. In addition, filled sand bags do not tend to be easily portable and, while functioning solely as a protective device, they fail to harness the energy of a flood's surge. As such, there is a need for a flood prevention device or apparatus that is easily transported, may be rapidly deployed and makes use of the energy generated by the flood surge force.

SUMMARY OF THE INVENTION

The present invention provides a fluid directional apparatus that meets the stated needs above. An aspect of an embodiment of the present invention contemplates that use of light materials in the construction of the fluid directional apparatus to enhance its portability. In one aspect of an embodiment of the present invention, the apparatus may be made out of plastic. The shape of the apparatus is that of an equilateral triangular prism. This shape allows the container or apparatus to provide a taller and stronger barrier than is possible using sand bags. In addition, modules of the fluid directional apparatus may be stacked together to provide a reinforced barrier against flood water or storm surges. The shape of the fluid directional apparatus also serves to dampen the surge impact force. The apparatus or device as contemplated by the present invention, may be rapidly deployed and may be filled with fluid at the deployment site at a much faster rate than filling sand bags with sand.

The apparatus contemplated by the invention provides advantages over other flood control systems/devices as it may be easily deployed, is portable and may be filled with liquid or water on location much faster than filling sand bags with sand. In addition, modules of the apparatus may protect much greater areas than would have been covered or protected by sand bag arrangements.

Groups or individual modules of the apparatus may be combined to be used as a barrier to flood waters thereby providing flood protection around buildings and other property. In addition, the apparatus may be used to channel flood water away from protected assets or property. The apparatus may also be used to store fresh water within it while also using the energy from a storm or flood surge to power a turbine which, in one aspect, may be located in the apparatus.

An aspect of an embodiment of the invention provides a fluid directional apparatus having a modular equilateral triangular prism enclosure with an interlocking system. In one aspect of an embodiment of the present invention, the interlocking system may be located on the exterior surface of the fluid directional apparatus, or on its side or any other part of the enclosure. The interlocking system may be used to connect each fluid directional apparatus module with another module. In one aspect, the interlocking system enables additional modules of the equilateral prism enclosures to be stacked and locked in position when deployed against a flood. In one aspect of the present invention, the interlocking system may include the use of Velcro strips or a groove and lock system or the like. The interlocking system may also include systems that ensure the modules do not slide out of place when connected with each other and/or deployed but rather stay in position as a bulwark against flood conditions. The modular equilateral triangular prism enclosure may have a protective covering over the enclosure to protect the enclosure from possible damage by flood debris. In an aspect of an embodiment of the present invention, the equilateral triangular prism enclosure may be filled with fluid, liquid or semi-liquid material to provide weight and stability to the module when deployed. The weight and pressure of the liquid enables a snug fit between each module. The fluid, liquid or semi-liquid material enclosed within the apparatus may also provide the same density and force as with the flood water impacting the apparatus. A seal tight opening located on the surface of the enclosure may be used for filling and emptying the enclosure of the fluid, liquid or semi-liquid material used. The seal tight opening may be closed or sealed using a seal tight apparatus. In one aspect of an embodiment of the present invention, this may include a three-way valve. The apparatus, as contemplated by the present invention, may also have more than one seal tight opening with accompanying seal tight apparatuses for closing the same.

The shape of the fluid directional apparatus provides the additional advantage of dampening the impact force of a storm surge by a factor of $\sin(\Theta)$, where $\Theta$ is the angular inclination of the equilateral triangular prism, i.e. 60 degrees. As such, the impact force, $F_I$ is given by, $$F_I = F_S \sin(60°)$$

Where, $F_I$ is the resultant impact force on the impact face of the fluid directional apparatus, and $F_S$ is the surge's original force.

In an aspect of an embodiment of the present invention, the enclosure may be collapsible whereby it may have an internal collapsible system that enables the enclosure to collapse once the fluid or liquid has been drained away. This eases the transportation of the apparatus.

In an aspect of an embodiment of the present invention, the enclosure may include an interior support system for maintaining the shape and reinforcing the structure of the apparatus.

In another aspect, a spring coil system may be used to "spring" the apparatus into shape and allow the container or apparatus to maintain its equilateral triangular prism shape before it is filled with fluid. The spring coil system may also provide structural support to the apparatus enclosure.

In another aspect of an embodiment of the present invention, the enclosure may include three impervious and sealtight sub-enclosures, where two of the sub-enclosures are adapted to being filled with fluid and the third is configured to have a turbine located within it The two sub-enclosures of the enclosure adapted to being filled with fluid may each have a seal tight opening located on the surface of each of the sub-enclosures, where each of the seal tight openings may be used for filling and emptying each sub-enclosure. Closing or sealing each seal tight opening may be implemented by use of a seal tight apparatus. In one aspect of an embodiment of the present invention, a screw plug may be used to close and seal each opening.

The turbine located within the third of the sub-enclosures may have an inlet on the impact face of the enclosure (i.e. the face of the enclosure facing and/or deployed against the flood) leading fluid or the flood water to the turbine. The inlet may be sealed off by a seal-tight inlet covering which prevents the inflow of water when the inlet is closed. The enclosure may further include a channel linked to the turbine and within the enclosure. Flood water flowing into the turbine inlet passes through the turbine thereby generating electricity which could be used at the flood site for powering emergency pumps, provide lighting etc. The flood water may then be channeled away from the turbine and then away from the enclosure, through additionally linked enclosures and to a desired location via the channel located within each enclosure. In an aspect of an embodiment of the present invention, the channels of each enclosure may be connected by way of a channel modular connector for connecting the channel of one enclosure with the channel of another adjacently positioned module. Water flowing through a system of the fluid directional modules may be channeled away from the deployment site towards wetlands or other desired locations. The channeling may also be used to dampen the effect of the water flow thereby reducing damage to assets or property.

In another aspect of an embodiment of the present invention, the enclosure may further include a protective covering over the enclosure. The covering may protect the enclosure from damage. In one aspect of an embodiment of the present invention, the protective covering may be made of Kevlar or similar material.

In another aspect of an embodiment of the present invention, the enclosure may further include a waterproof and reinforced covering for covering the inlet leading to the turbine. The covering is adapted to prevent unwanted inflow of fluid or flood water into the sub-enclosure containing the turbine.

In another aspect of an embodiment of the present invention, a sieve or like device may be used to protect the turbine from debris flowing into the fluid directional apparatus. This structure or device may be located at the mouth of the inlet.

A further aspect of an embodiment of the present invention provides a fluid directional apparatus, which may have a modular triangular prism enclosure having the angles 30, 60 and 90 degrees. The apparatus may additionally include an interlocking system on the exterior of the modular triangular prism enclosure, where the interlocking system enables the modular triangular prism enclosure to be connected and locked in position with additional modules of said triangular prism enclosures. The additional modules may be of the same configuration or different configurations. For example, similarly configured modules having the angles 30, 60 and 90 degrees may connect and be locked with the apparatus along with other modules which are equilateral in configuration. In a further aspect of an embodiment of the present invention, the apparatus may also include a protective covering over its enclosure where the covering serves to protect the enclosure from damage. The apparatus may also include one or more seal tight openings located on the surface of the enclosure for filling and emptying the enclosure along with one or more a seal tight apparatuses for closing the seal tight opening(s).

It should be noted and appreciated that the fluid directional apparatus may be used in applications other than flood protection, but other areas of fluid flow.

Additional aspects, objectives, features and advantages of the present invention will become apparent from the following description of the preferred embodiments with reference to the attached drawings.

DETAILED DESCRIPTION OF THE INVENTION

Figure 1:
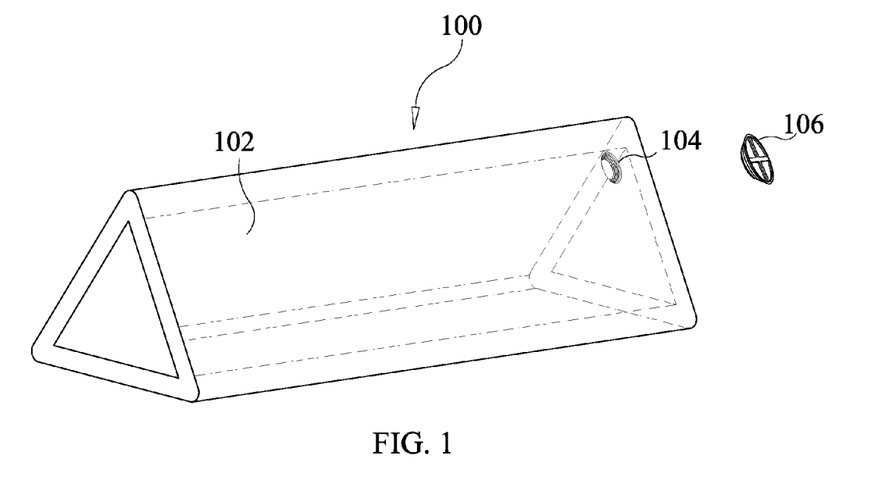
FIG. 1 illustrates a perspective view of a fluid directional apparatus according to an aspect of an embodiment of the present invention.

Referring now to FIG. 1 a perspective view of a fluid directional apparatus 100 according to an aspect of an embodiment of the present invention is shown. Fluid directional apparatus 100 has protective covering 102 meant to protect apparatus 100 from damage by flood debris. Apparatus 100 may be filled with fluid, liquid or semi-liquid material by way opening 104 located on its surface. It should be noted that apparatus 100 may have additional openings 104 both for filling and draining apparatus 100 of fluid, liquid or semi-liquid material. The fluid is used to provide apparatus 100 with weight and support against an oncoming flood surge. The fluid, liquid or semi-liquid material used may also provide apparatus 100 with stability. Each opening 104 may be closed using a corresponding seal tight apparatus 106. In one aspect of an embodiment of the present invention, a screw plug may be used. Seal tight apparatus (es) 106 may be screwed into place to a final position which is flush against the surface of apparatus 100.

Figure 2:
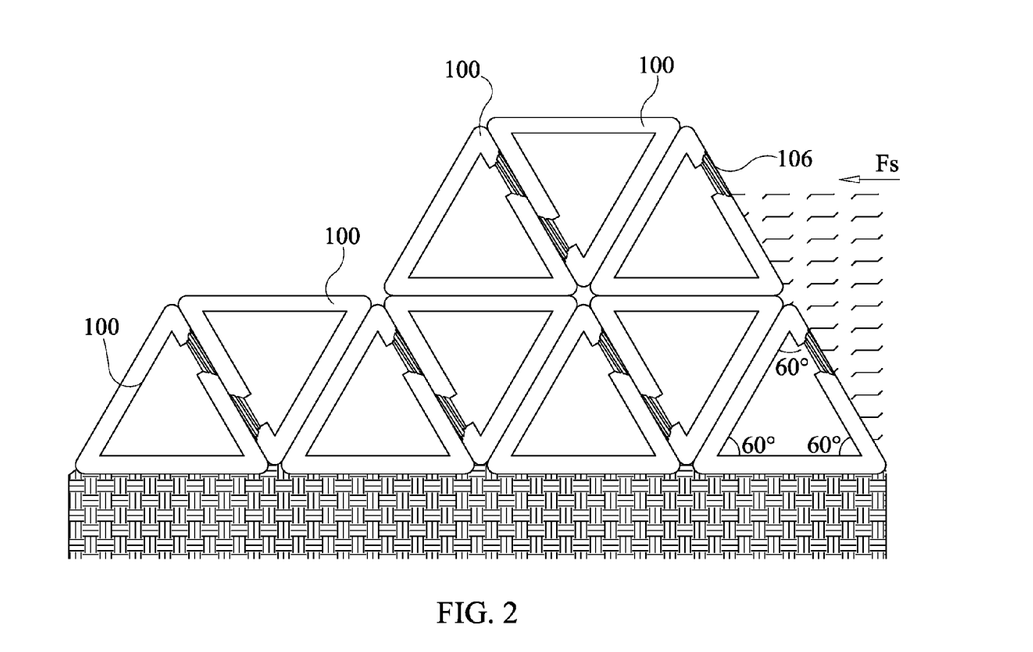
FIG. 2 illustrates a side view of a number of fluid directional apparatus modules in position according to an aspect of an embodiment of the present invention.

Referring now to FIG. 2, a side view of a number of fluid directional apparatus modules 100 in position according to an aspect of an embodiment of the present invention are shown. Multiple modules of fluid directional apparatus 100 may be deployed together as shown which provides a side view of the deployment according to an aspect of an embodiment of the present invention. The multiple modules of fluid directional apparatus 100 are positioned in place and kept in position relative to each other by way of an interlocking system located around and about each apparatus.

The impact force of a surge against each individual fluid directional apparatus or system of multiple interconnected fluid directional apparatus enclosures, may be dampened or reduced by a factor of sin(60) as a result of each module's equilateral shape, where Θ is the angular inclination of the equilateral triangular prism, i.e. 60 degrees. As such, the impact force, $F_I$ is given by, $$F_I = F_S \sin(60°)$$

Where, $F_I$ is the resultant impact force on the impact face of the fluid directional apparatus, and $F_S$ is the surge's original force.

Figure 3:
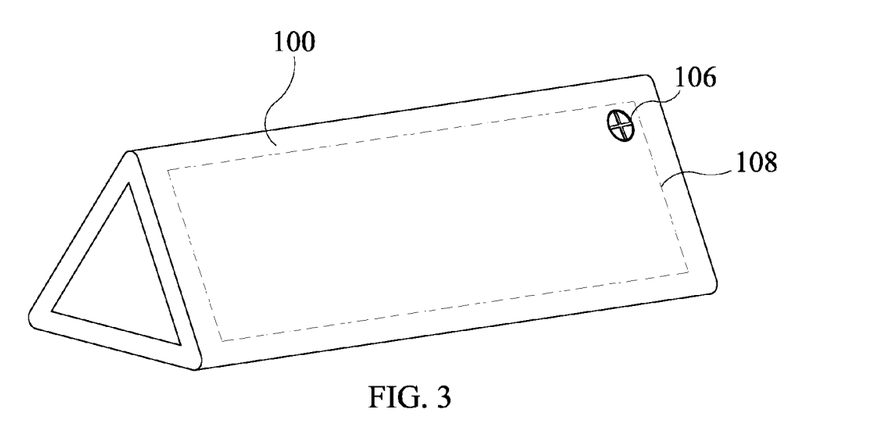
FIG. 3 illustrates a perspective view of another fluid directional apparatus showing an external interlocking system according to an aspect of an embodiment of the present invention.
Figure 4:
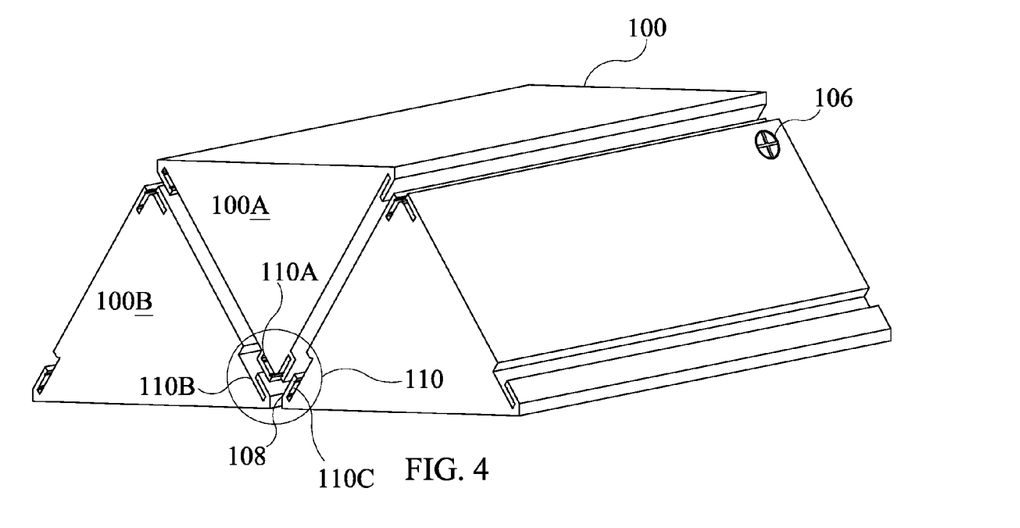
FIG. 4 illustrates a perspective view of another fluid directional apparatus showing another external interlocking system according to an aspect of an embodiment of the present invention.

Referring now to FIGS. 3 and 4, perspective views of another fluid directional apparatus having interlocking system(s) according to aspect(s) of an embodiment of the present invention are shown. Here, interlocking system 108 is shown around the exterior surface of apparatus 100. Seal tight apparatus 106 is also shown sealing opening 104 and being flush against the surface exterior of apparatus 100. Typically, interlocking system 108 may be any system that ensures that modules of fluid directional apparatus 100 are held in position when deployed together. In one aspect of an embodiment of the present invention, the interlocking system 108 may be implemented using Velcro strips. In another aspect of an embodiment of the present invention, interlocking system 108 may comprise of a system of male-female groove interlocks 110A, 110B and 110C as shown in FIG. 4.

Figure 4A:
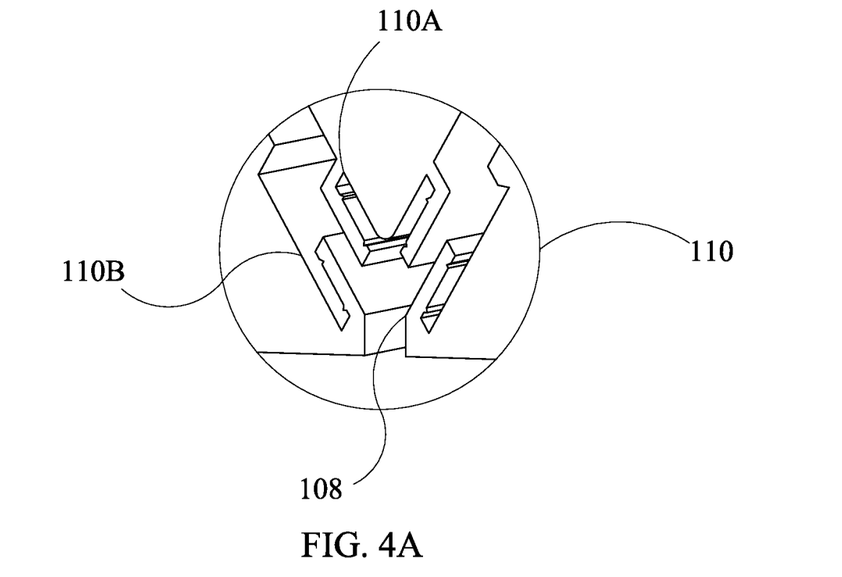
FIGS. 4A & 4B illustrate the details of an interlocking system of fluid directional apparatus modules according to an aspect of an embodiment of the present invention.
Figure 4B:
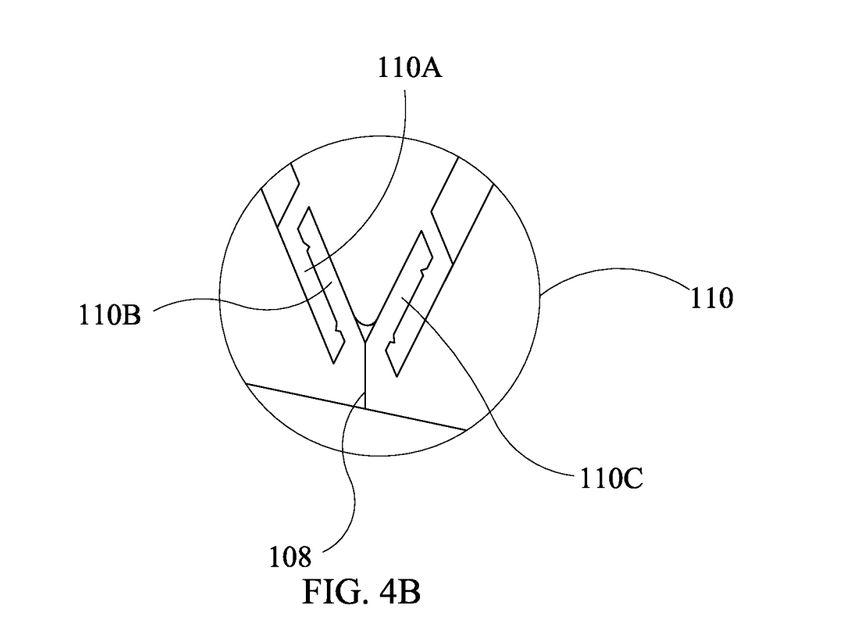

Referring now to FIGS. 4A & 4B, the details of an interlocking system 110 of fluid directional apparatus module 100 according to an aspect of an embodiment of the present invention are shown. In FIG. 4A, groove interlocks 110A, 110B and 110C are shown when they are not yet locked in place. In one aspect, at each end of a groove there may be an end plate (not shown), positioned perpendicular to each grove end, which would prevent the modules from sliding out of the grove. In another aspect of an embodiment of the present invention, the end plate may be easily locked or unlocked to enable the release of the enclosure—i.e. enable the enclosures to be slid out of position in relation with one another.

Referring back to FIGS. 4A & 4B, inverted fluid directional apparatus module 100A may have male groove interlock 110A which slides into place with female groove interlocks 110B and 110C of fluid directional apparatus modules 100B and 100C as shown in FIG. 4B. Groove interlock 110 may, in one aspect of an embodiment of the present invention, by made out of hardened plastic or metal.

Figure 5A:
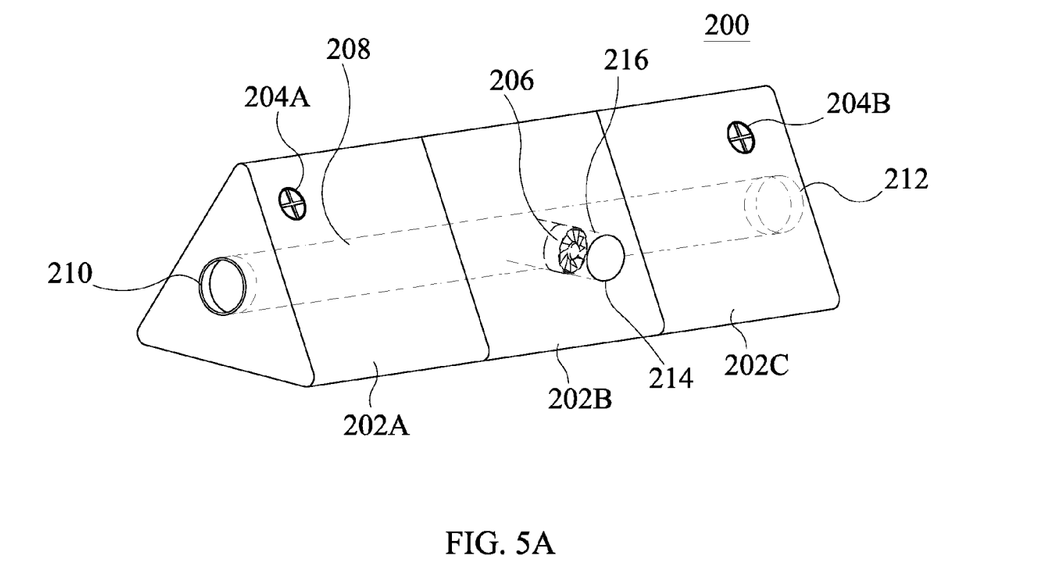
FIG. 5A illustrates a perspective view of a fluid directional apparatus having a turbine and channel according to an aspect of an embodiment of the present invention.

Referring now to FIG. 5A a perspective view of a fluid directional apparatus 200 having a turbine 206 and channel 208 according to an aspect of an embodiment of the present invention is shown. Apparatus 200 is shown having three sub-enclosures 202A, 202B and 202C. Sub-enclosures 202A and 202C are adapted to being filled with fluid by way of seal-tight openings 204A and 204B respectively. Each of the seal tight openings may be used to fill and empty sub-enclosures 202A and 202C with fluid, liquid or semi-liquid material.

Apparatus 200 also includes a third sub-enclosure, 202B which contains a turbine 206. Turbine 206 may be, in one aspect of an embodiment of the present invention, located close to the impact face of apparatus 200. Leading to turbine 206 is an opening 214 and sub-channel 216 through which an inflow of flood water or fluid is led to turbine 206 for turbine 206 to be activated to start generating electricity from the inflow. Turbine 206 may be used to generate electricity at the flood deployment site which may then be used for other flood damage prevention activities such as powering pumps or providing emergency lighting at the deployment site. Opening 214 may be covered, closed and protected by a waterproof and reinforced covering which is capable of preventing unwanted inflow of fluid into sub-enclosure 202B containing turbine 206. In one aspect of an embodiment of the present invention, a sieve or like device may be used to protect the turbine from debris flowing into the fluid directional apparatus. This structure or device may be located at the mouth of the inlet.

Figure 5B:
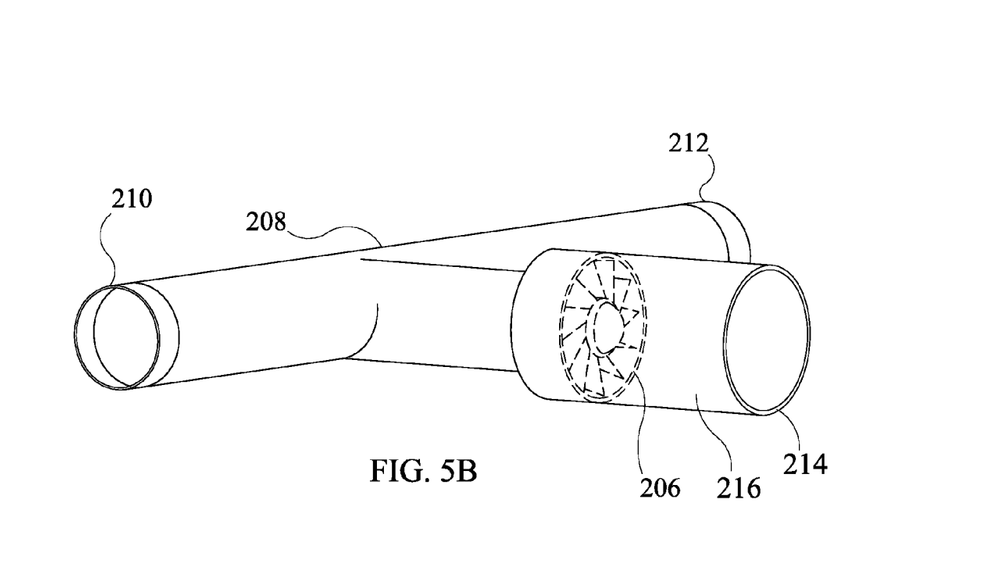
FIG. 5B illustrates a perspective view of a fluid directional apparatus interior channel according to an aspect of an embodiment of the present invention.

Referring now to FIG. 5B a perspective view of an internal or interior channel 208 of fluid directional apparatus 200 according to an aspect of an embodiment of the present invention is shown. Internal channel 208 is positioned within apparatus 200 to help direct the fluid inflow after it has passed through turbine 206. The fluid inflow is then directed out of apparatus 200 to adjacent fluid directional apparatuses also having internal channels which are connected with the internal channel 208 by way of channel modular connectors 210 and 212 on either end of internal channel 208. In one aspect, channel modular connectors 210 and 212 may be screw type connectors, clip connectors, plug in connectors or the like. In another aspect, they may have seal tight configurations to prevent leakage.

Figures 6, 7A:
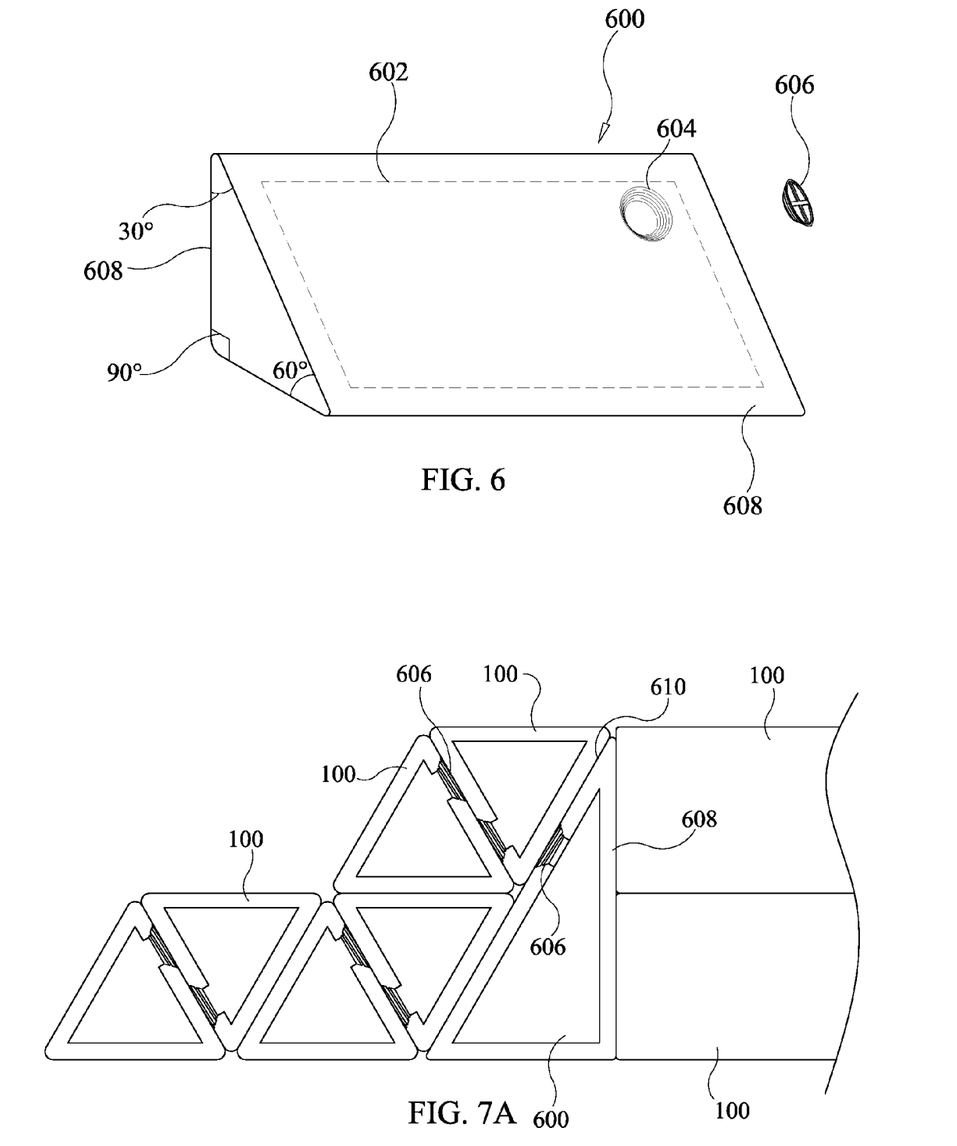
FIG. 6 illustrates a perspective view of a fluid directional apparatus having a 30, 60 and 90 degree angular configuration according to another aspect of an embodiment of the present invention.
FIGS. 7A & 7B illustrate side and perspective views of a fluid directional apparatus having a 30, 60 and 90 degree angular configuration and being used in conjunction with other fluid directional apparatuses according to an aspect of an embodiment of the present invention.

Referring now to FIG. 6 a perspective view of a fluid directional apparatus 600 having a 30, 60, 90 degree angular configuration according to an aspect of an embodiment of the present invention is shown. Fluid directional apparatus 600 has protective covering 602 meant to protect apparatus 600 from damage by flood debris. Apparatus 600 may be filled with fluid, liquid or semi-liquid material by way opening 604 located on its surface. It should be noted that apparatus 600 may have additional openings 604 both for filling and draining apparatus 600 of fluid, liquid or semi-liquid material. The fluid is used to provide apparatus 600 with weight and support against an oncoming flood surge. The fluid, liquid or semi-liquid material used may also provide apparatus 600 with stability. Each opening 604 may be closed using a corresponding seal tight apparatus 606. In one aspect of an embodiment of the present invention, screw plug(s) may be used. Seal tight apparatus 606 may be screwed into place to a final position which is flush against the surface of apparatus 600. Apparatus 600 may be configured to have, in one aspect of an embodiment of the present invention, the angles 30, 60 and 90 degree angular configuration as shown.

Figure 7B:
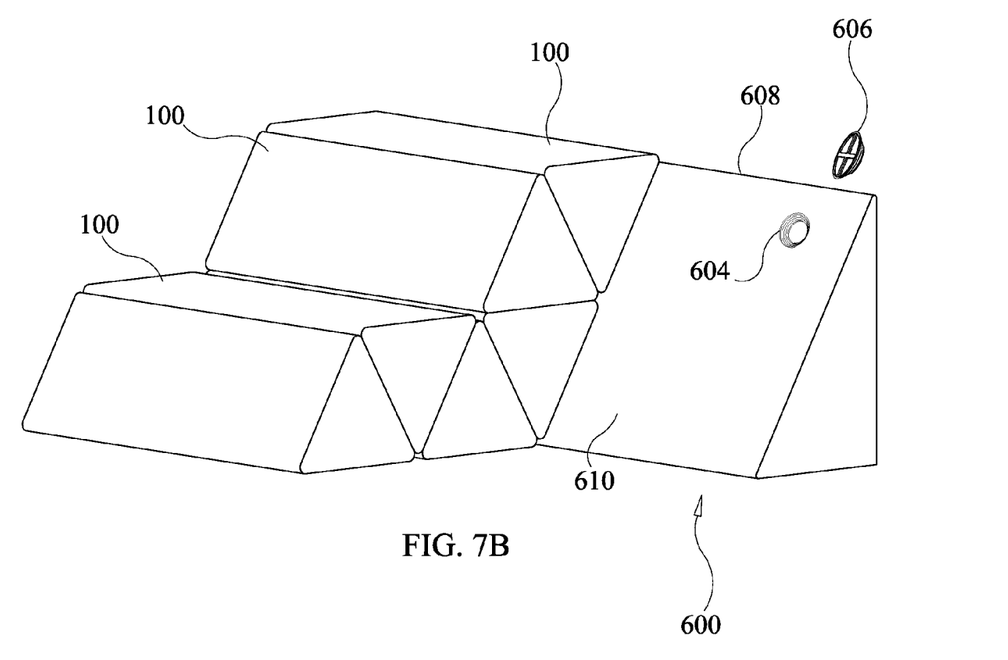

Referring now to FIGS. 7A & 7B, side and perspective views of a fluid directional apparatus 600 having a 30, 60, 90 degree angular configuration and being used in conjunction with other fluid directional apparatuses according to an aspect of an embodiment of the present invention are shown. Here, apparatus 600 may be configured to interlock, with one or more modules of apparatus 100 as shown in FIGS. 7A and 7B. In this aspect, apparatus 600 may act as a protective module and/or an end module for the side of a deployment of one or more multiple modules 100. In yet another aspect of an embodiment of the present invention, apparatus 600 may be twice the height of apparatus 100. Apparatus 600 may interlock with the deployment of one or multiple modules 100 by way of one or more of its sides (sides 608 and/or side 610 as shown, but not limited to these), each of which may have an interlock system for doing so. Apparatus 600 may also interlock with similarly configured modules having the same 30, 60 and 90 degree angular configuration.

Although this present invention has been disclosed with reference to specific forms and embodiments, it will be evident that a great number of variations may be made without departing from the spirit and scope of the present invention. For example, equivalent elements may be substituted for those specifically disclosed and certain features of the present invention may be used independently of other features—all without departing from the present invention as defined in the appended claims

What is claimed is:

1. A fluid directional apparatus, comprising:
    a modular equilateral triangular prism enclosure, wherein the enclosure comprises of three impervious and seal-tight sub-enclosures, wherein a first and a second of the three sub-enclosures are capable of being filled with fluid;
    at least a seal tight opening located on the surface of each of the sub-enclosures adapted to being filled with fluid, wherein each of the seal tight opening is configured for filling and emptying each of the sub-enclosure;
    at least a seal tight apparatus for closing each of the seal tight opening;
    an interlocking system on the exterior of the modular equilateral triangular prism enclosure, wherein the interlocking system enables the modular equilateral triangular prism to be connected and locked in position with additional modules of the equilateral triangular prism enclosures;
    a turbine located within a third of the three sub-enclosures, wherein the third sub-enclosure has an inlet on an impact face of the enclosure allowing inflow of fluid to the turbine; and
    a channel linked to the turbine and within the enclosure, wherein the channel channels the inflow of fluid away from the enclosure.

2. The apparatus of claim 1, further comprising a protective covering over the enclosure wherein the covering protects the enclosure from damage.

3. The apparatus of claim 1 further comprising a waterproof and reinforced covering for covering the inlet, wherein the covering is capable of preventing unwanted inflow of fluid into the sub-enclosure containing the turbine.

4. The apparatus of claim 1 further comprising a channel modular connector for connecting the channel with another channel of another equilateral triangular prism enclosure.

* * * * *